(12) United States Patent
Donovan (10) Patent No.: US 8,024,403 B2
(45) Date of Patent: Sep. 20, 2011

(54) TOP OF HOUR PRESENCE AND CALENDAR STATE INTERACTION

(75) Inventor: Steven R. Donovan, Dallas, TX (US)

(73) Assignee: Cisco Technology, Inc., San Jose, CA (US)

( * ) Notice: Subject to any disclaimer, the term of this patent is extended or adjusted under 35 U.S.C. 154(b) by 174 days.

(21) Appl. No.: 12/246,704

(22) Filed: Oct. 7, 2008

(65) Prior Publication Data

US 2010/0088388 A1    Apr. 8, 2010

(51) Int. Cl.
G06F 15/16    (2006.01)
(52) U.S. Cl. ........ 709/204; 709/206; 709/207; 713/163; 707/2; 707/3; 707/10
(58) Field of Classification Search .................. 709/204, 709/207, 206
See application file for complete search history.

(56) References Cited

U.S. PATENT DOCUMENTS

| | | | | |
|---|---|---|---|---|
| 5,636,345 | A * | 6/1997 | Valdevit | 709/224 |
| 7,679,518 | B1 * | 3/2010 | Pabla et al. | 340/573.1 |
| 2004/0078464 | A1 * | 4/2004 | Rajan et al. | 709/224 |
| 2005/0018826 | A1 * | 1/2005 | Benco et al. | 379/202.01 |
| 2005/0265318 | A1 * | 12/2005 | Khartabil et al. | 370/352 |
| 2006/0161395 | A1 * | 7/2006 | Beam et al. | 702/185 |
| 2006/0179466 | A1 * | 8/2006 | Pearson et al. | 725/109 |
| 2006/0190600 | A1 * | 8/2006 | Blohm et al. | 709/225 |
| 2008/0016174 | A1 * | 1/2008 | Schiavone et al. | 709/207 |
| 2008/0228893 | A1 * | 9/2008 | MacDonald et al. | 709/207 |
| 2008/0320093 | A1 * | 12/2008 | Thorne | 709/206 |
| 2009/0070482 | A1 * | 3/2009 | Hickmott et al. | 709/233 |
| 2009/0112984 | A1 * | 4/2009 | Anglin et al. | 709/204 |
| 2009/0204671 | A1 * | 8/2009 | Hawkins et al. | 709/204 |

* cited by examiner

Primary Examiner — Krista Zele
Assistant Examiner — Ondrej Vostal
(74) Attorney, Agent, or Firm — PSU (57) ABSTRACT

In one embodiment, a method includes identifying a critical time when a current presence state associated with a first client is scheduled to change to a timed presence state. The method also includes generating a first presence document before the critical time, and providing the first presence document to at least a second client. The first presence document has an indication of the current presence state and the timed presence state, and is provided to the second client before the critical time.

22 Claims, 7 Drawing Sheets

TOP OF HOUR PRESENCE AND CALENDAR STATE INTERACTION

BACKGROUND OF THE INVENTION

The present invention relates generally to presence systems.

Within a presence system, when there is a state change associated with a source of a presence state, watchers of the source are notified of the state change. By way of example, if a source accepts a telephone call, the presence state of the source may switch from indicating that the source is available to indicating that the source is on a call, and watchers of source may be notified that the source is on a call. Alternatively, if a source begins to participate in a scheduled meeting, watchers of the source may be notified that a meeting state indicates that the source is involved in a meeting. That is, a presence state change notification may be sent to watchers to indicate that a presence state of a watched user has changed.

Calendaring changes, e.g., changes in meeting states, for sources or users tend to occur at substantially the same time. Often, calendaring changes occur at the top of an hour. As such, a relatively high number of presence state change notifications may generally need to be sent at approximately the top of an hour. Sending a relatively high number of presence state change notifications at approximately the same time often creates a performance spike in the presence server that lasts until a queue of notifications is emptied. The performance spike may slow the sending of notifications, thereby causing watchers to receive the notifications a significant amount of time after state changes take place.

BRIEF DESCRIPTION OF THE DRAWINGS

The invention will be readily understood by the following detailed description in conjunction with the accompanying drawings in which.

DESCRIPTION OF EXAMPLE EMBODIMENTS

General Overview

According to one aspect of the present invention, a method includes identifying a critical time when a current presence state associated with a first client is scheduled to change to a timed presence state. The method also includes generating a first presence document before the critical time, and providing the first presence document to at least a second client. The first presence document has an indication of the current presence state and the timed presence state, and is provided to the second client before the critical time.

Description

Within a network, Session Initiation Protocol (SIP) nodes may request notification from other SIP nodes when certain events have occurred. Notifications may be provided in NOTIFY messages sent by a presence server to subscribers, e.g., watchers. By way of example, when a presence entity associated with a presence server experiences a change in a presence state, the presence server may generate NOTIFY messages which are arranged to notify appropriate watchers of the change in the presence states.

Presence information may be included in presence documents which, in turn, are included in NOTIFY messages. The presence information may be presented in a presence information data format (PIDF). PIDF defines a basic XML format for presenting presence information for a presence entity, e.g., a client of a presence server. As described in RFC 4481, entitled "Timed Presence Extensions to the Presence Information Data Format (PIDF) to Indicate Status Information for Past and Future Time Intervals," which is incorporated herein by reference in its entirety, allows for timed presence states to be presented in presence documents. A timed presence state allows a time in the future when a presence state will come into effect to be indicated in a presence document.

Many presence state changes occur at the same time. By way of example, many presence state changes occur at critical times such as a top of an hour or at a bottom of an hour. Hence, many presence state changes are effectively reported at the critical times. The processing of a significant number of presence state changes at substantially the same time often results in some notifications of the state changes not being received until well after the state changes take place. Hence, at the critical times, due to the amount of presence state changes to be processed, many watchers may not be expediently informed of presence state changes. That is, some NOTIFY messages may not be sent to and received by watchers until significantly after the presence state changes take effect.

For presence state changes that are known in advance, e.g., for calendar states, or otherwise predefined, NOTIFY messages may be generated prior to a critical time. By generating NOTIFY messages prior to a critical time, the number of NOTIFY messages generated and sent substantially at the critical time and, after the critical time, may be reduced. Generating and sending NOTIFY messages prior to a critical time for state changes that are known in advance effectively reduces the number of NOTIFY messages that are generated and sent substantially in real-time. In one embodiment, substantially only those NOTIFY messages associated with state changes that are not known in advance are generated and sent in real-time or, more generally, approximately when the state changes occur.

Addressing presence state changes that are known in advance prior to the state changes occurring allows the efficiency with which a presence server operates to be improved as the processing of state changes is spread out rather than clustered, e.g., clustered at a critical time. In addition, allowing state changes to be provided to watchers in advance of the state changes occurring allows the watchers to effectively "see" the state changes in a relatively timely manner.

For a scheduled state change, a presence document may be generated or updated during a time period before a critical time for the scheduled state change. The time period may be configured as appropriate to ensure that substantially all state changes scheduled for the critical time may effectively be provided to watchers before the critical time. For example, the time period may be configured to enable presence documents to be generated for state changes scheduled for a critical time, and to enable NOTIFY messages that include the presence documents to be generated and sent, prior to the critical time.

In one embodiment, providing information relating to scheduled presence state changes to watchers before the presence state changes take effect may include generating presence documents using a suitable timed presence mechanism, e.g., the timed presence mechanism described in RFC 4481. NOTIFY messages that are used to provide information relating to scheduled presence state changes may be placed in a queue, and then sent at a substantially controlled rate over a period of time prior to the state changes occurring.

Presence states may include, but are not limited to including, login states, voice call states, calendar states, meeting states, and location states. Login states may be associated with the presence of a user with respect to an application or a website. Voice call states may indicate whether a user is on a call or not. Calendar states may indicate whether or not a user has a scheduled meeting. Meeting states generally identify whether a user is involved in or otherwise logged into a meeting. Location states typically identify a current location of a user or, more specifically, a device owned or otherwise associated with the user.

Figure 1:
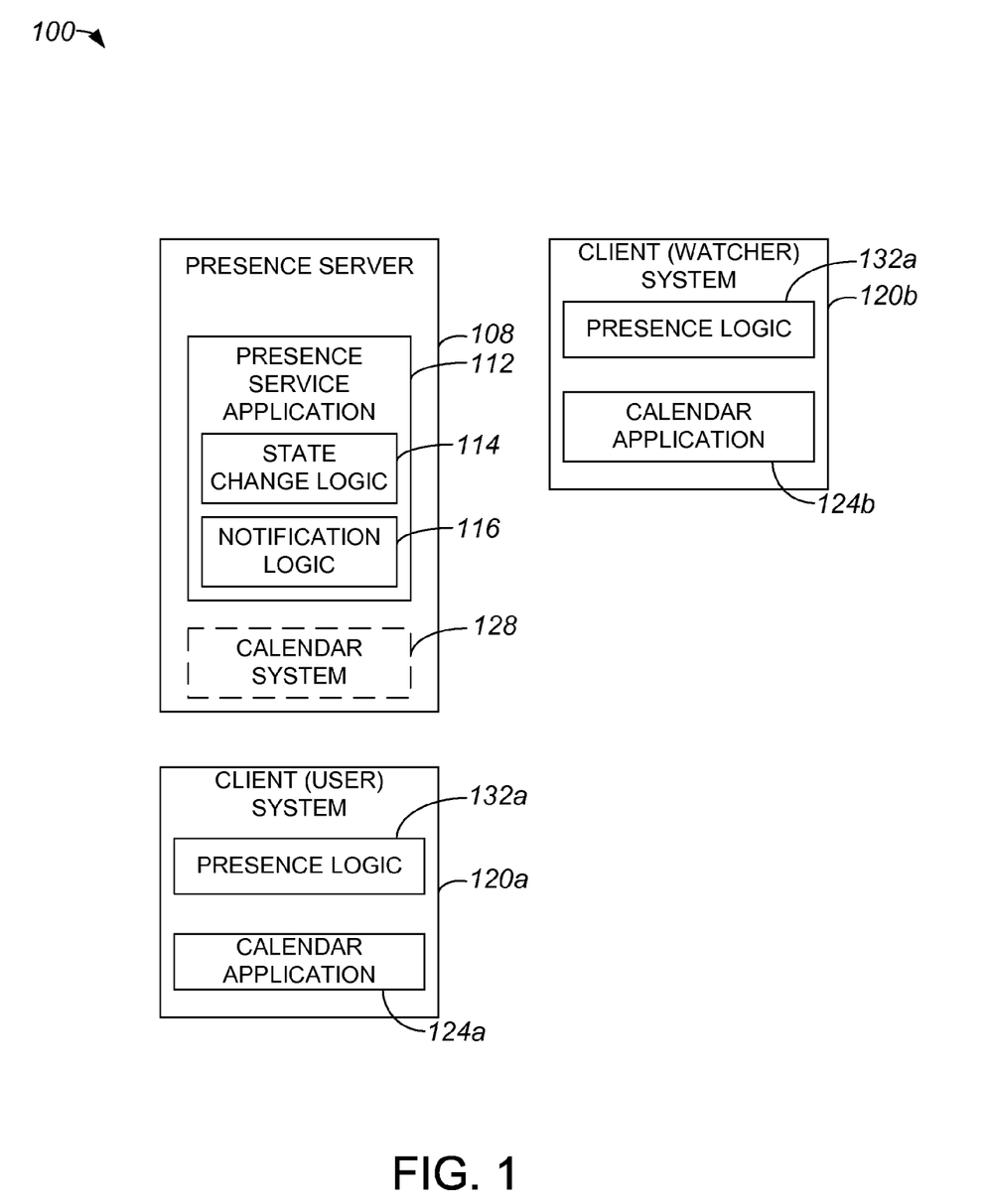
FIG. 1 is a block diagram presentation of an overall system which includes a presence server capable of sending NOTIFY messages prior to an occurrence of a scheduled event in accordance with an embodiment of the present invention.

Referring initially to FIG. 1, an overall system which includes a presence server capable of sending NOTIFY messages prior to an occurrence of a scheduled event will be described in accordance with an embodiment of the present invention. An overall system 100 includes a presence server 108 and a plurality of client systems 120a, 120b. Presence server 108 may be a system such as the Cisco Unified Presence (CUP) server available commercially from Cisco Systems, Inc., of San Jose, Calif. Client systems 120a, 120b may be substantially any systems, e.g., computing systems, which are supported by presence server 108.

Presence server 108 includes a presence service application 112. Presence service application 112 may be include hardware and/or software logic that is embodied on a tangible medium. Such logic is typically executable and, hence, operable to perform the functionality of presence service application 112. Presence service application 112 includes state change logic 114 and notification logic 116. State change logic 114 is arranged to process state changes associated with clients 120a, 120b. Notification logic 116 is arranged to generate updated presence documents that include the state changes, and to notify clients 120a, 120b of the state changes. State change logic 114 and notification logic 116 are generally arranged to identify state changes which are scheduled or otherwise expected to occur at a critical time, and to process those state changes in a time period prior to the critical time, as will be discussed below with reference to FIG. 2.

In one embodiment, presence server 108 includes a calendar system 128 that is arranged to maintain the calendars of clients 120a, 120b. Such a calendar system 128 may be arranged to obtain, e.g., periodically obtain, and to store information stored in calendar applications 124a, 124b. State change logic 114 may use information stored by calendar system 128 to identify when state changes, e.g., calendar state changes, are scheduled to occur at critical times. For instance, state change logic 114 may identify when client 124a, which is a presence entity or a user, will have an associated state change at a critical time. Then, prior to the critical time occurring, notification logic 116 may generate a NOTIFY message that is arranged to inform client 124b, which is watching for state changes that are associated with client 124a, that a state change for client 124a is anticipated at the critical time. It should be appreciated that although client 120a is described as being a user that has a scheduled state change and client 120b is described as being a watcher of client 120a, clients 120a, 120b are generally both users and watchers. That is, clients 120a, 120b may generally be arranged to monitor each other's presence using presence server 108.

Presence logic 132a, 132b, which may include hardware and/or software logic, is generally arranged to obtain and to process information, as for example NOTIFY messages that contain presence documents, received from presence server 108. Presence logic 132a, 132b obtains NOTIFY messages, identifies state changes identified therein, and identifies the time at which the state changes go into effect. Presence logic 132a, 132b also determines whether the state changes are to be rendered, and then renders those state changes. In other words, presence logic 132a, 132b is arranged to effectively render a state change at the time a state change occurs.

As discussed above, state changes which are scheduled to begin at a critical time may be processed just prior to the critical time. With respect to a calendar system, for example, a process to notify a first client of a state change associated with a calendar event for a second client may begin prior to the state change taking effect.

In general, calendar events which are predefined to begin at a critical time may effectively be processed during a predetermined time period prior to the critical time. While such a critical time may be the top of an hour or the bottom or an hour, it should be appreciated that the critical time may be substantially any time. In the predetermined time period before the critical time, NOTIFY messages may be sent to relevant watchers such that those messages are effectively available to the watchers at the critical time. By way of example, NOTIFY messages arranged to provide notification of calendar state changes which occur at the top of an hour may be processed and sent to watchers in a time period defined just before the top of the hour.

Figure 2:
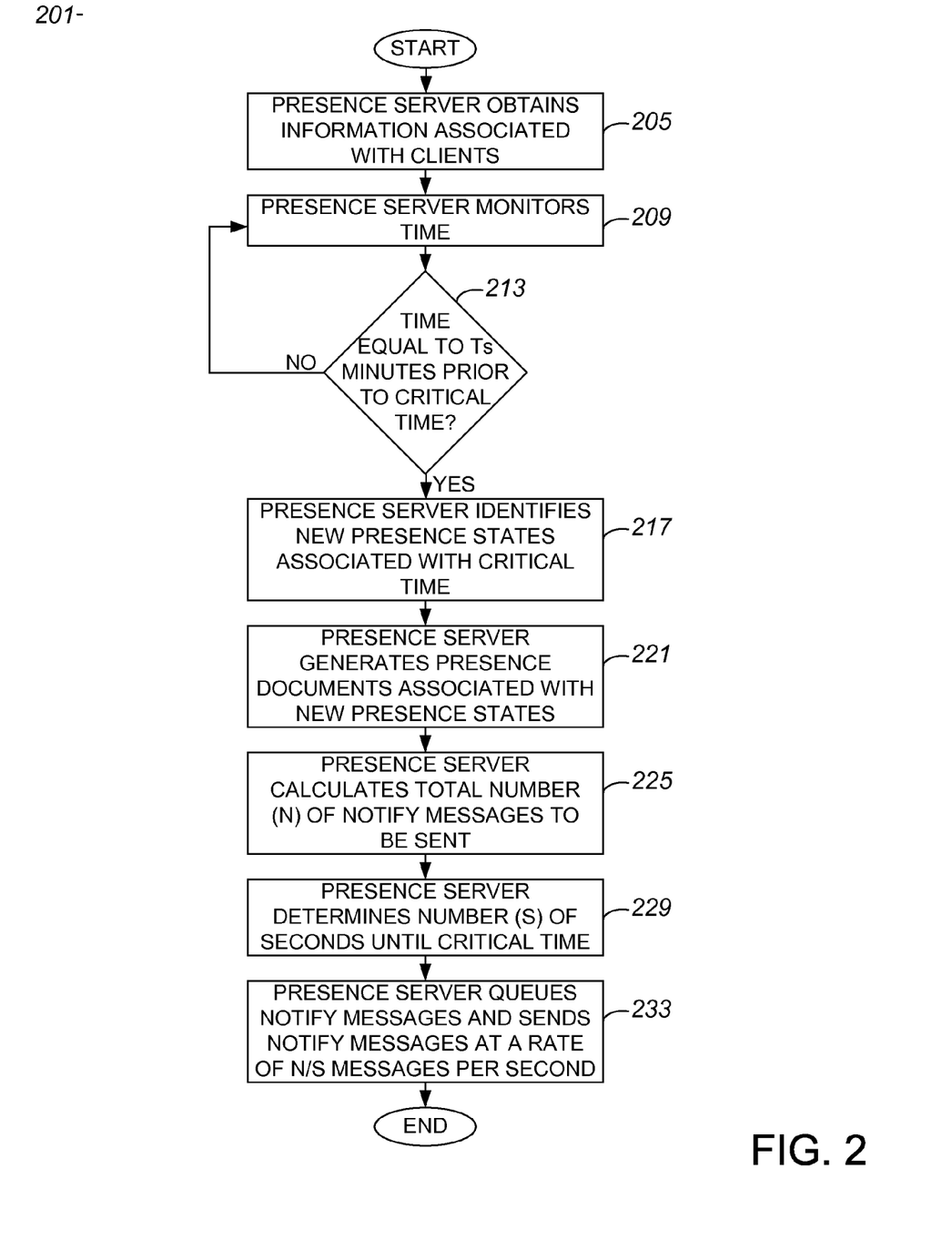
FIG. 2 is a process flow diagram which illustrates a method of distributing NOTIFY messages from the point-of-view of a presence server in accordance with an embodiment of the present invention.

FIG. 2 is a process flow diagram which illustrates a method of notifying watchers of a scheduled state change from the point-of-view of a presence server in accordance with an embodiment of the present invention. A process 201 of notifying watchers of a scheduled state change, or a state change scheduled to occur at a critical time, begins at step 205 in which a presence server obtains information associated with watchers or, more generally, clients in an overall system. Such clients may generally include substantially all watchers supported by the presence server. Obtaining information may include accessing computing systems of the clients to acquire the information. By way of example, information from the calendar applications of the clients may be obtained, and the acquired information may be stored in a calendar system of the presence server. In one embodiment, the calendar information may be periodically obtained such that information stored in the calendar system may remain relatively current.

After information is obtained, the presence server monitors time in step 209. It is then determined in step 213 whether the current time is approximately equal to a predetermined number (Ts) of minutes prior to a critical time. As previously mentioned, the critical time may be, for example, the top of an hour, the bottom of an hour, or substantially any other time. Ts may generally be any amount of time prior to the critical time. By way of example, Ts may be approximately ten minutes before the critical time. It should be appreciated that Ts is typically fully configurable by an administrator of the presence server, and may be configured to substantially ensure that there is ample time to create and send NOTIFY messages.

If it is determined that the current time is not approximately equal to Ts minutes before the critical time, then the presence server continues to monitor the time in step 209. Alternatively, if it is determined that the current time is approximately equal to Ts minutes prior to the critical time, the indication is that the presence server may begin processing calendar states that are scheduled to change at the critical time. As such, process flow proceeds to step 217 in which the presence server identifies new presence states associated with the critical time. In other words, changes in current presence states of users which will occur approximately at, or are associated with, the critical time are identified. The new presence states may be identified using the information obtained in step 205. It should be appreciated that while the new presence states may include login states, voice call states, calendar states, meeting states, and/or location states.

Once the presence server identifies new presence states, the presence server generates presence documents associated with the new presence states in step 221. The presence documents typically indicate current states of users or presence entities. Timed states, e.g., the states of the users at approximately the critical time, are also generally included in the presence documents. Presence documents typically includes state information about presence entities. Such state information may include, but is not limited to including, the login state of a user, information regarding whether a user is currently on the phone, etc. The state information may be used to facilitate a determination of a probability of being able to establish communications with a user. In one embodiment NOTIFY messages may be used to transport a presence document from a presence server to a watcher.

In step 225, the presence server calculates a total number (N) of NOTIFY messages to be sent to watchers of any users which will have new calendar states at approximately the critical time. The NOTIFY messages are to be sent as a result of the new presence documents generated in step 221, and generally contain the presence documents.

After N is determined, i.e., after the number of NOTIFY messages to be sent is determined, the presence server determines a number (S) of seconds remaining until the critical time in step 229. In general, Ts is selected such that the critical time is unlikely to be reached before the NOTIFY messages are sent. Ts is typically selected to effectively ensure that the NOTIFY messages are sent either prior to the critical time or at approximately the critical time. Once S is determined, the presence server queues the NOTIFY messages, then sends or otherwise provides the NOTIFY messages in step 233 to appropriate clients, e.g., watchers. The NOTIFY messages are sent at a substantially controlled rate of approximately N/S messages per second before the critical time is reached. In other words, the NOTIFY messages are queued and then sent at a rate that is approximately equal to the total number of NOTIFY messages to be sent divided by the number of seconds remaining until the critical time. Upon sending the NOTIFY messages, the process of notifying watchers of a scheduled state change is completed.

In one embodiment, when a watcher receives a NOTIFY message, the watcher effectively receives at least one updated presence document that identifies a timed state for a user that is being watched by the watcher. It should be appreciated, however, that not all presence documents contain timed presence information. For example, a presence document which may result form asynchronous evens such as the initiation of a phone call may not contain timed presence information.

Timed presence information may be included in a presence document during a time period from Ts to a critical time when a user is scheduled to be in a meeting. Such a timed state is a new presence state for the user that will be effective at a critical time that is also specified in the updated presence document. A watcher, upon receiving an updated presence document, may be aware of a timed presence state or element, as well as the critical time when the timed presence state will take effect. In general, the new presence state is not rendered until approximately the critical time.

Figure 3:
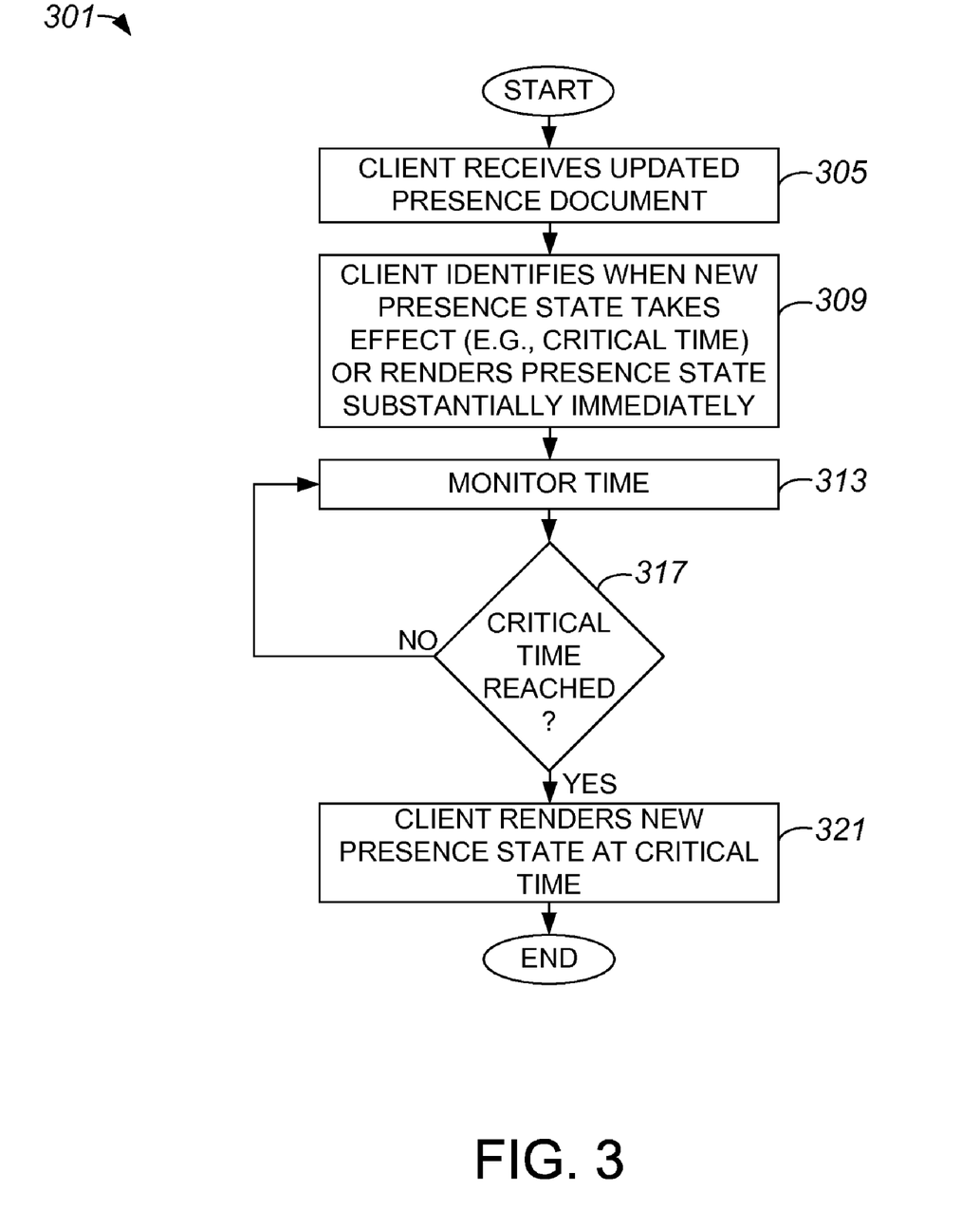
FIG. 3 is a process flow diagram which illustrates a method of processing a received presence document from the point of view of a watcher in accordance with an embodiment of the present invention.

FIG. 3 is a process flow diagram which illustrates a method of processing a received presence document from the point of view of a watcher in accordance with an embodiment of the present invention. A method 301 of processing an updated presence document received by a watcher begins at step 305 in which a watcher or, more generally, a client of a presence server, receives an updated presence document. The updated presence document is typically received from a presence server as a part of a NOTIFY message.

After the client receives an updated presence document, the client identifies when a new presence state takes effect in step 309. The client may process the updated presence document to identify both a particular user who is scheduled to have a new presence state and a critical time at which the new presence state will take effect. In one embodiment, the client identifies a timed state in the updated presence document and a time at which the timed state takes effect. It should be appreciated, however, that if a presence document does not include a timed state, a presence state may be rendered substantially immediately.

In step 313, the client monitors time to determine whether the critical time associated with the new presence state has been reached. A determination is made in step 317 as to whether the critical time has been reached. If the critical time has not been reached, the client continues to monitor time in step 313. Alternatively, if the critical time has been reached, the indication is that the new presence state is in effect. Accordingly, in step 321, the client renders the new presence state. Rendering the new presence state may include, but is not limited to including, displaying an indication that a user being watched by the client is in the new presence state. Once the client renders the new presence state, the method of processing an updated presence document is completed.

Figure 4A:
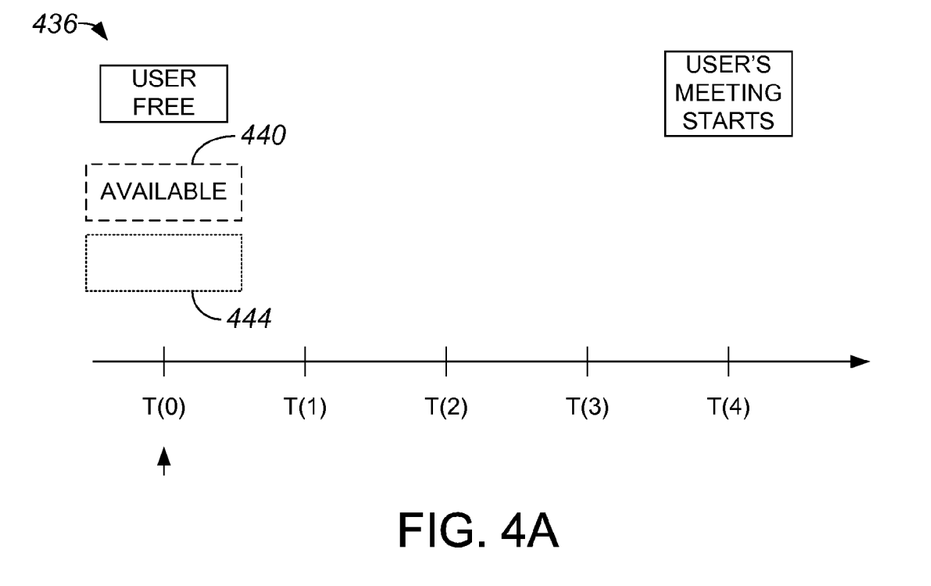
FIG. 4A is a diagrammatic representation of presence states associated with a user at a time T(0) in accordance with an embodiment of the present invention.

A presence document is generally arranged to provide an indication of a current state associated with a user and an indication of a future state, e.g., a timed presence state or a timed state, of the user. Such a presence document may be generated and sent to a watcher before a critical time is reached, as discussed above with respect to FIG. 2. A presence document may also be generated and sent to a watcher when there are changes to a current state. In general, a presence server continues to handle presence state changes after sending a presence document that contains a timed state. With reference to FIGS. 4A-E, the handling of a sequence of events that result in changes to current and/or timed presence states will be described in accordance with an embodiment of the present invention. FIG. 4A is a diagrammatic representation of presence states associated with a user at a time T(0) in accordance with an embodiment of the present invention. At a time T(0), a timeline 436 is such that a user who has a meeting scheduled to start at a time T(4) is free. A current presence state 440 of the user at time T(0) indicates that the user is available, e.g., not in a meeting and not on a call. A timed presence state 444 of the user at time T(0) is effectively non-existent, as a time period Ts before time T(4) has not been reached.

Figure 4B:
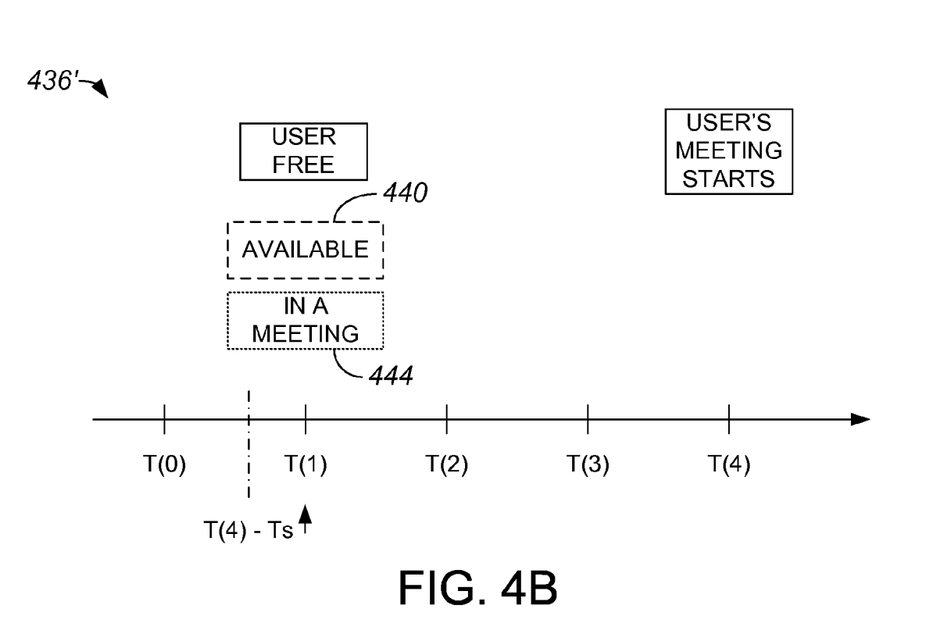
FIG. 4B is a diagrammatic representation of presence states associated with a user at a time T(1) after a timed state has been updated in accordance with an embodiment of the present invention.
Figure 4C:
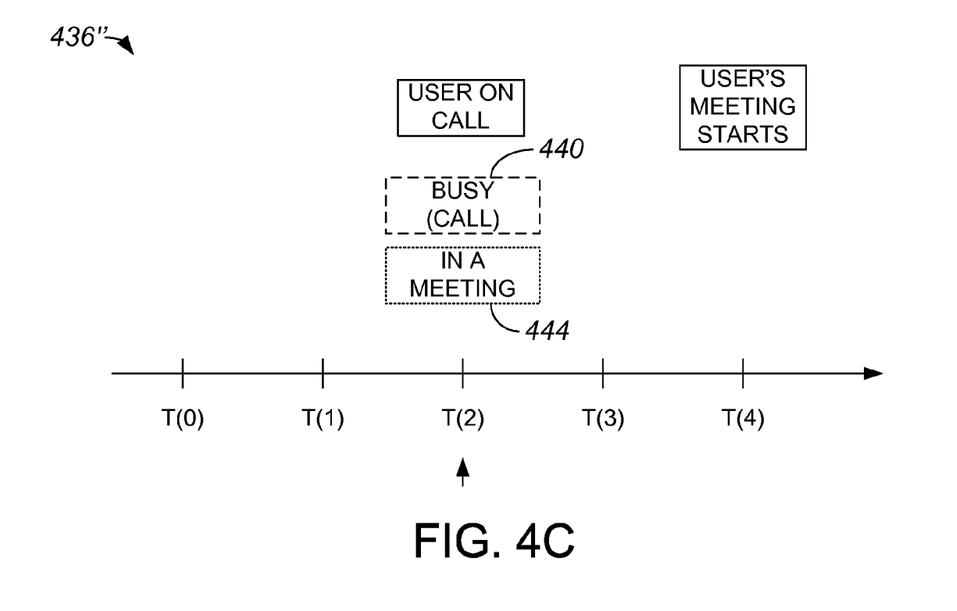
FIG. 4C is a diagrammatic representation of presence states associated with a user at a time T(2) after a user accepts an unscheduled telephone call in accordance with an embodiment of the present invention.

A time T(1), as shown in FIG. 4B, occurs within a time period Ts before a time T(4). As such, at time T(1), timeline 436' indicates that current state 440 of the user is available. Timed state 444, at time T(1), indicates that at the next critical time, the user will be in a meeting. In the described embodiment, the next critical time is time T(4). At approximately time T(1), a presence server may send an updated presence document to those watching the user which indicates current state 440 and timed state 444.

At time T(2), after an updated presence document is sent to watchers by a presence server, the current state 440 may change. By way of example, as shown in timeline 436" of FIG. 4C, the user may accept a phone call prior to timed state 444 effectively taking effect. Because the user is on a phone call, current state 440 changes to indicate that the user is busy, while timed state 444 continues to indicate that the user will be in a meeting at the next critical time. A presence server may send an updated presence document to watchers which indicates that current state 440 has changed.

Figure 4D:
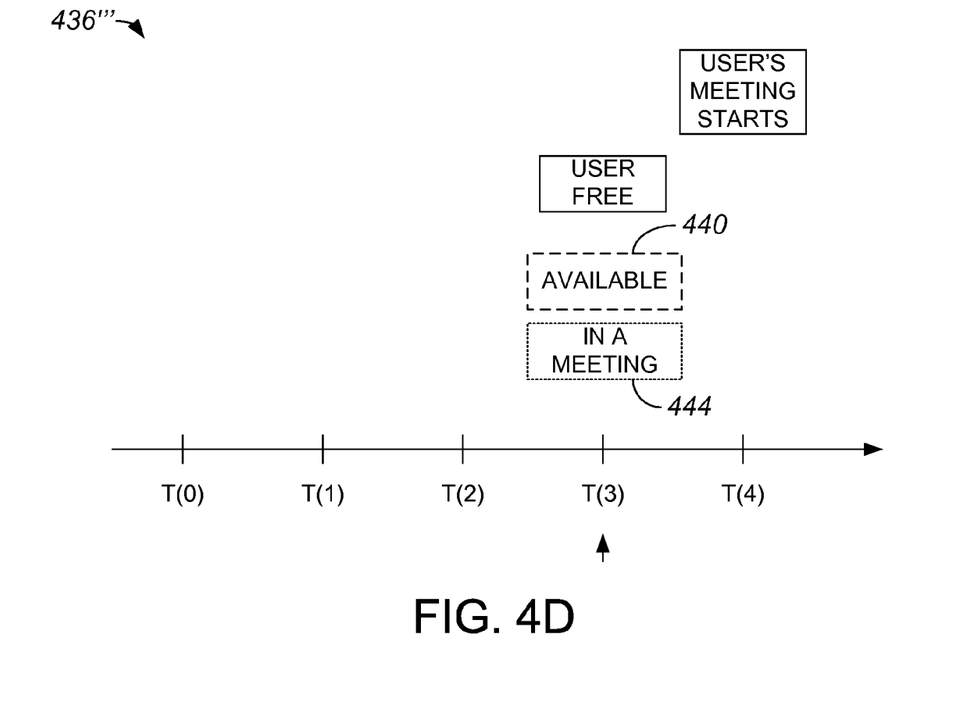
FIG. 4D is a diagrammatic representation of presence states associated with a user at a time T(3) after a user ends an unscheduled telephone call in accordance with an embodiment of the present invention.

FIG. 4D is a diagrammatic representation of timeline 436''' presence states 440, 444 at a time T(3) after the user ends the phone call in accordance with an embodiment of the present invention. At time T(3), the user is once again free. Hence, current state 440 changes to indicate that the user is available and that timed state 444 has not taken effect. As the critical time for timed state 444 has not been reached, timed state 444 continues to indicate that the user will be in a meeting at the critical time. Therefore, an updated presence document which indicates that current state 440 has changed may be sent to watchers.

Figure 4E:
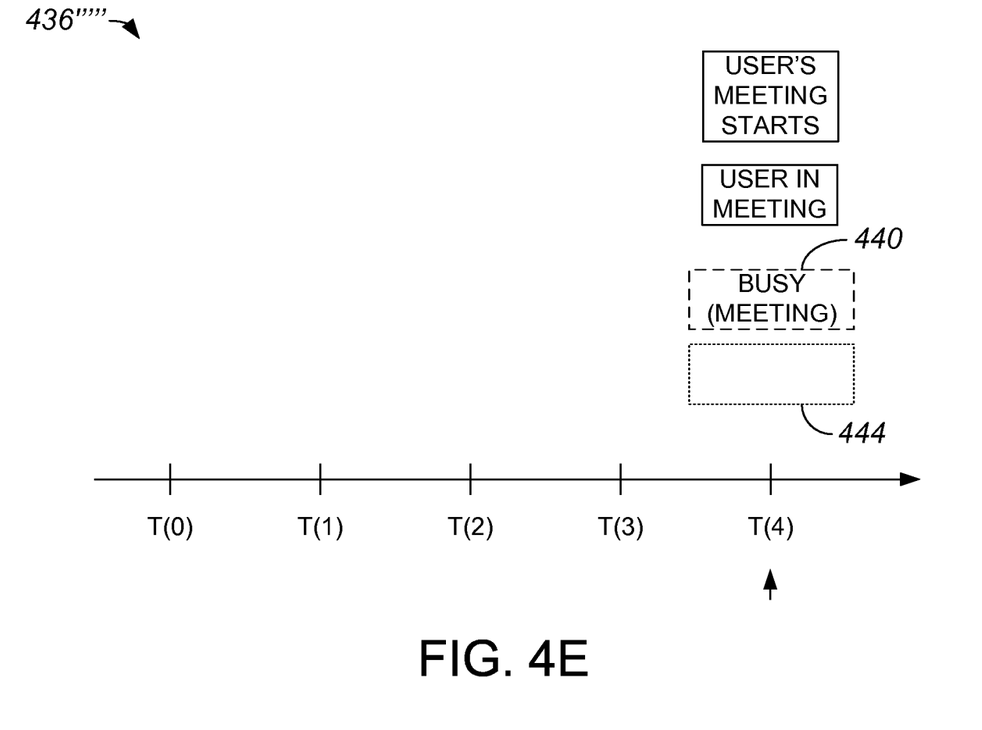
FIG. 4E is a diagrammatic representation of presence states associated with a user at a time T(4) when a scheduled meeting begins in accordance with an embodiment of the present invention.

When the critical time is reached, i.e., when a time T(4) is reached, the user's meeting starts, as shown in timeline 436'''' of FIG. 4E. As a result, current state 440 is updated to indicate that the user is in a meeting, and timed state 444 is updated to indicate that there is no timed state. In the described embodiment, timed state 444 is essentially not applicable at time T(4). A presence server may send a new presence document at approximately T(4). However, it should be appreciated that because timed state 444 substantially implicitly goes away when the time associated with timed state 444 passes, a new presence document is typically not sent at time T(4).

Figure 5:
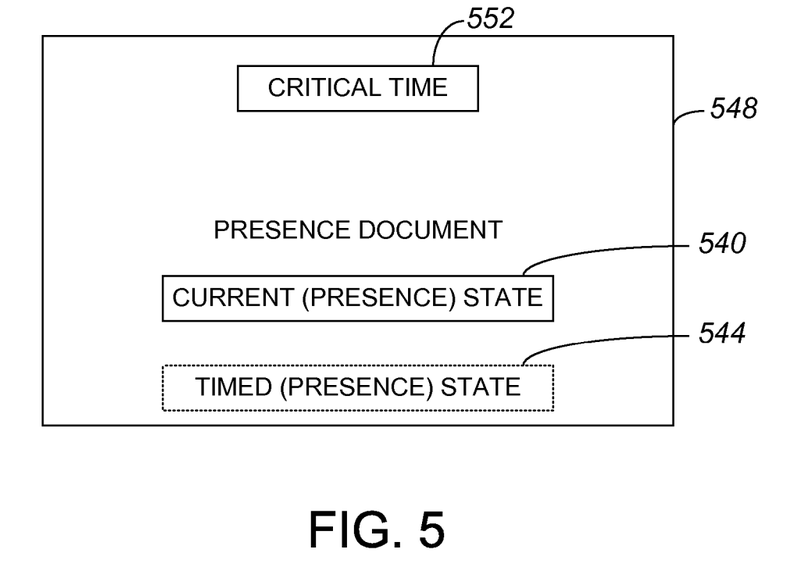
FIG. 5 is a diagrammatic representation of a presence document in accordance with an embodiment of the present invention.

As previously mentioned, a presence document may indicate a current presence state of a user and a timed presence state of the user. FIG. 5 is a diagrammatic representation of a presence document in accordance with an embodiment of the present invention. A presence document 548, which is typically of a presence information document format (PIDF) that describes presence information, is generally generated by a presence server and provided to clients.

Presence document 548 identifies a current presence state 540 of a user. Current presence state 540 typically indicates the presence state of the user at substantially the time that presence document 548 is generated. Presence document 548 also identifies an optional timed presence state 544 and a critical time 552. Timed presence state 544 identifies a presence state for the user that will go into effect at approximately critical time 552. By way of example, if critical time 552 is a top of an hour, then timed presence state 544 may identify a new presence state that will go into effect for the user at the top of the hour.

A presence server may support both clients that support timed events and clients that do not support timed events. In general, mechanisms associated with SIP implementation may be used to provide a presence server with information regarding the ability of a client to process or otherwise handle timed events. By way of example, a client may include a token which indicates an ability to process timed events. Such a token may either be included as a part of a SIP supported header or as a part of a SIP event header.

Figure 6A:
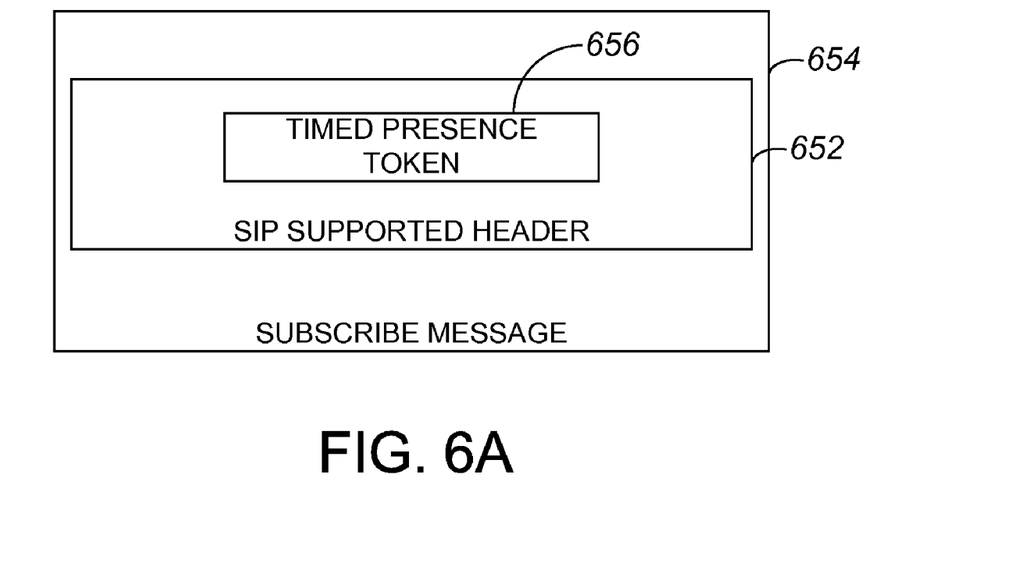
FIG. 6A is a diagrammatic representation of a session initiation protocol (SIP) supported header associated with a client in which a timed presence token is included in accordance with an embodiment of the present invention.

FIG. 6A is a diagrammatic representation of a SIP supported header that is part of a SUBSCRIBE message associated with a client in which a timed presence token is included in accordance with an embodiment of the present invention. A SIP supported header 652, which may be part of a SUBSCRIBE message 654, is used to indicate when a client supports SIP extensions, and may include a timed presence token 656. Timed presence token 656 is arranged to indicated that an originator of SIP supported header 652 supports timed presence and, hence, is capable of processing NOTIFY messages which contain information relating to a scheduled state change.

Figure 6B:
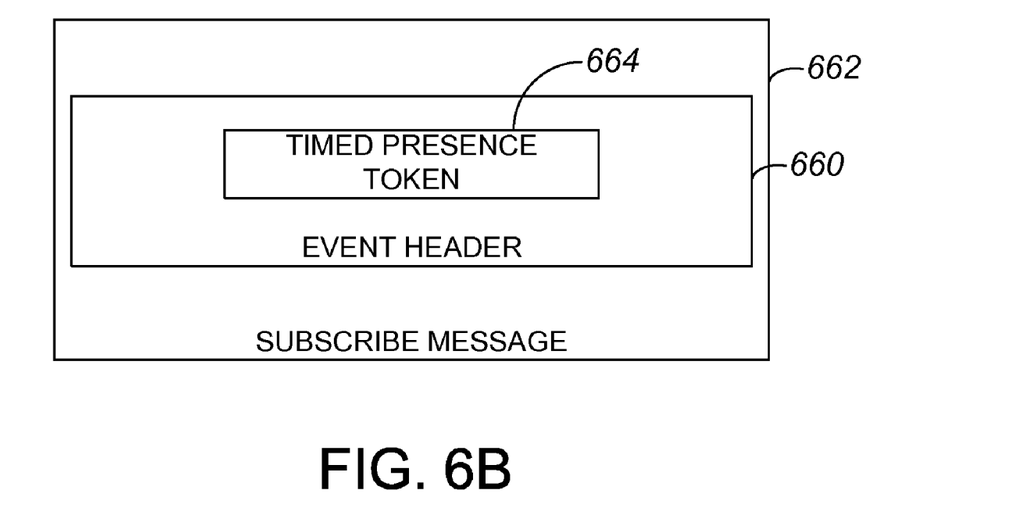
FIG. 6B is a diagrammatic representation of a SIP event header associated with a client in which a timed presence token is included in accordance with an embodiment of the present invention.

FIG. 6B is a diagrammatic representation of a SIP event header that is part of a SUBSCRIBE message associated with a client in which a timed presence token is included in accordance with an embodiment of the present invention. An event header 660 may include a timed presence token 664, and may be associated with a SUBSCRIBE message 662. Typically, event header 660 identifies an event or class of events supported by a message. By way of example, event header 660 may indicate that a presence event is supported. Time presence token 664 may indicate that a presence event supported by event header 660 is a timed presence event.

Although only a few embodiments of the present invention have been described, it should be understood that the present invention may be embodied in many other specific forms without departing from the spirit or the scope of the present invention. By way of example, while calendar state changes have generally been described, state changes are not limited to being calendar state changes. State changes may be associated with substantially any synchronized or otherwise predictable events.

As previously mentioned, not all clients associated with a presence server may support timed presence that involves sending state changes in advance. Hence, a presence server may be arranged to differentiate between clients that are capable of processing state changes sent in advance, and clients that are incapable of processing state changes sent in advance. Headers supported by clients may be arranged to indicate whether time presence is supported or not. To accommodate both clients that support timed presence that processes state changes sent in advance and clients which do not, a timed presence NOTIFY message may be sent in advance to clients that support timed presence, and a NOTIFY message may be sent at the time a scheduled event occurs to clients that do not support timed presence.

In one embodiment, separate queues may be maintained for clients, e.g., watchers, that support timed presence and clients that do not support timed presence. If separate queues are maintained, the queue for clients that do not support timed presence may contain a presence document that effectively reflects a real or current state at the time an event occurs.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:

1. A method comprising:
    identifying a critical time when a current presence state associated with a first client is scheduled to change to a timed presence state;
    generating a first presence document before the critical time, the first presence document being arranged to indicate the current presence state and the timed presence state;
    providing the first presence document to at least a second client, the first presence document being provided to the at least second client before the critical time, wherein providing the first presence document to the at least second client includes providing the first presence document to the at least second client in a first NOTIFY message; and
    generating at least a second presence document before the critical time;
    providing the at least second presence document to at least a third client in a second NOTIFY message;
    calculating a total number of NOTIFY messages to be provided, the total number of NOTIFY messages including the first NOTIFY message and the second NOTIFY message; and
    determining a number of seconds until the critical time, wherein providing the at least first presence document to the at least second client in the first NOTIFY message and providing the at least second presence document to the at least third client in the second NOTIFY message includes sending the at least first NOTIFY message and the at least second NOTIFY message at a rate calculated using the total number of NOTIFY messages to be provided and the number of seconds until the critical time.

2. The method of claim 1 wherein generating the first presence document before the critical time includes identifying a time period before the critical time and generating the first presence document during the time period.

3. The method of claim 2 wherein the time period is approximately ten minutes or less before the critical time.

4. The method of claim 1 wherein the critical time corresponds to a scheduled calendar event.

5. The method of claim 1 wherein the critical time is one selected from a group including a top of an hour and a bottom of an hour.

6. The method of claim 1 further including:
    obtaining calendar information associated with the first client, wherein the timed presence state is identified using the calendar information.

7. Logic encoded in one or more non-transitory tangible storage media for execution and when executed operable to:
    identify a critical time when a current presence state associated with a first client is scheduled to change to a timed presence state;
    generate a first presence document before the critical time, the first presence document being arranged to indicate the current presence state and the timed presence state;
    provide the first presence document to at least a second client, the first presence document being provided to the at least second client before the critical time, wherein the logic operable to provide the first presence document to the at least second client includes logic operable to provide the first presence document to the at least second client in a first NOTIFY message;
    generate at least a second presence document before the critical time;
    provide the at least second presence document to at least a third client in a second NOTIFY message;
    calculate a total number of NOTIFY messages to be provided, the total number of NOTIFY messages including the first NOTIFY message and the second NOTIFY message; and
    determine a number of seconds until the critical time, wherein the logic operable to provide the at least first presence document to the at least second client in the first NOTIFY message and the logic operable to provide the at least second presence document to the at least third client in the second NOTIFY message is further operable to send the at least first NOTIFY message and the at least second NOTIFY message at a rate calculated using the total number of NOTIFY messages to be provided and the number of seconds until the critical time.

8. The logic of claim 7 wherein the logic operable to generate the first presence document before the critical time includes the logic operable to identify a time period before the critical time and generating the first presence document during the time period.

9. The logic of claim 8 wherein the time period is approximately ten minutes or less before the critical time.

10. The logic of claim 7 wherein the critical time corresponds to a scheduled calendar event.

11. The logic of claim 7 wherein the critical time is one selected from a group including a top of an hour and a bottom of an hour.

12. The logic of claim 7 further operable to:
    obtain calendar information associated with the first client, wherein the timed presence state is identified using the calendar information.

13. An apparatus comprising:
    means for identifying a critical time when a current presence state associated with a first client is scheduled to change to a timed presence state;
    means for generating a first presence document before the critical time, the first presence document being arranged to indicate the current presence state and the timed presence state;
    means for providing the first presence document to at least a second client, the first presence document being provided to the at least second client before the critical time, wherein the means for providing the first presence document to the at least second client include means for providing the first presence document to the at least second client in a first NOTIFY message:
    means for generating at least a second presence document before the critical time;

means for providing the at least second presence document to at least a third client in a second NOTIFY message;

means for calculating a total number of NOTIFY messages to be provided, the total number of NOTIFY messages including the first NOTIFY message and the second NOTIFY message; and means for determining a number of seconds until the critical time, wherein the means for providing the at least first presence document to the at least second client in the first NOTIFY message and the means for providing the at least second presence document to the at least third client in the second NOTIFY message are arranged to send the at least first NOTIFY message and the at least second NOTIFY message at a rate calculated using the total number of NOTIFY messages to be provided and the number of seconds until the critical time.

14. An apparatus comprising:

at least one non-transitory medium;

a state change arrangement, the state change arrangement being configured to identify a critical time, the state change arrangement further being configured to identify a scheduled state change associated with a first client, the scheduled state change being scheduled to occur at the critical time, the state change arrangement being embodied on at least one non-transitory medium; and a notification arrangement, the notification arrangement being configured to process the scheduled state change before the critical time, the notification arrangement further being configured to create and to provide an indication of the scheduled state change to a second client, the notification arrangement being embodied on the at least one non-transitory medium, wherein the apparatus supports the first client and the second client and wherein the notification arrangement is still further configured to identify a time period during which the notification arrangement processes the scheduled state change before the critical time and to send a plurality of NOTIFY messages, the plurality of NOTIFY messages including a first NOTIFY message that provides the indication of the scheduled state change to the second client, wherein the plurality of NOTIFY messages are sent at a controlled rate, the controlled rate being determined based on a number of seconds until the critical time and a number of NOTIFY messages.

15. The apparatus of claim 14 wherein the apparatus is a presence server.

16. The apparatus of claim 14 further including a calendar arrangement, the calendar arrangement being embodied on the at least one non-transitory medium and arranged to obtain calendar information from the first client, the state change arrangement being arranged to process the calendar information to identify the scheduled state change.

17. The apparatus of claim 14 wherein the notification is configured to create and to provide the indication of the scheduled state change to the second client in a presence document.

18. The apparatus of claim 17 wherein the presence document includes an indication of a current state of the first client.

19. The apparatus of claim 14 wherein the critical time is one of a top of an hour and a bottom of the hour.

20. The method of claim 1 wherein the current presence state indicates a presence state of the first client at a time when the first presence document is generated.

21. The method of claim 20 wherein the presence state is at least one selected from a group comprising a login state, a meeting state, and a location state.

22. The method of claim 20 wherein the presence document is of a presence information document format (PIDF).

\* \* \* \* \*